3,361,726
PROCESS FOR PREPARING POLY(9,10-DIMETHYLENEANTHRACENE)
Rudolph Henry Michel, Tonawanda, N.Y., assignor to E. I. du Pont de Nemours and Company, Wilmington, Del., a corporation of Delaware
No Drawing. Filed Sept. 30, 1963, Ser. No. 312,304
5 Claims. (Cl. 260—93.5)

ABSTRACT OF THE DISCLOSURE

A process for preparing poly(9,10-dimethyleneanthracene) having a molecular weight of at least 8,000 is provided by treating poly(9-vinylanthracene) with trifluoroacetic acid.

---

This invention relates to polymeric materials and processes for their preparation and more particularly to the conversion of poly(9-vinylanthracene) by a strong organic acid to poly(9,10-dimethyleneanthracene) of sufficiently high molecular weight to be formed into shaped articles.

It is an object of this invention to provide poly(9,10-dimethylene anthracene) of sufficiently high molecular weight to be formed into shaped articles and a process for its preparation by the conversion of poly(9-vinylanthracene) by a strong organic acid. These and other objects will appear hereinafter.

It has been surprisingly found that poly(9-vinylanthracene) can be converted to poly(9,10-dimethyleneanthracene) with attendant proton shift and aromatization. This conversion results in an insoluble and relatively intractable polymer having a molecular weight of at least 8,000 from a tractable intermediate polymer.

Poly(9,10-dimethyleneanthracene) has the structure:

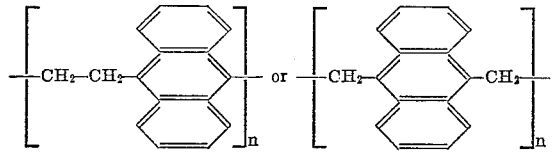

and is prepared by treating poly(9-vinylanthracene) with a strong organic acid having a $K_a$ of at least $1 \times 10^{-1}$ and which is incapable of replacing a hydrogen from the aromatic ring, i.e., incapable of aromatic substitution, under the conditions of the conversion. The conversion is accomplished by simply mixing the strong acid with the polymer or into a solution of the polymer at about 15–25° C. overnight, or for shorter times at higher temperatures—e.g., 2 hours at 70° C. The critical feature in this respect is that the catalyst, e.g., for example, trifluoroacetic acid—be kept in the reaction mixture. This can be accomplished at temperatures even higher than 70° C., if desired.

Poly(9-vinylanthracene) is readily prepared by cationic polymerization of 9-vinylanthracene in a liquid which is a solvent for the monomer at temperatures in the range of −30° C. to −130° C. Representative solvents are toluene, chloroform, methylene chloride, carbon disulfide, dichloromonofluoromethane, and trichloromonofluoromethane. Representative cationic initiators are a 1:1 molar ratio of titanium tetrachloride and aluminum triisobutyl, titanium tetrachloride alone, stannic chloride and boron trifluoride. In general, higher molecular weights result from lower reaction temperatures.

Poly(9-vinylanthracene) has the structure:

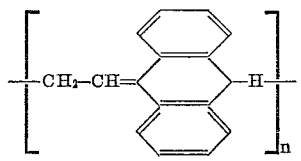

in which $n$ is at least 40 so that the polymer has a molecular weight of at least 8,000, and up to 30,000 or higher. It can be solvent-cast into desired shapes such as films or fibers.

When poly(9-vinylanthracene) prepared as above is treated with a strong organic acid having a $K_a$ of at least $1 \times 10^{-1}$, such as trifluoroacetic acid, it is readily converted to poly(9,10-dimethyleneanthracene) which is much less soluble in organic solvents and is much higher melting. Some samples are infusible up to about 360° C. or higher.

Representative strong acids for the conversion are certain halogenated carboxylic acids such as trifluoroacetic acid and trichloroacetic acid, and organic sulfonic acids such as p-toluene sulfonic acid, n-butyl sulfonic acid, isoamyl sulfonic acid, benzene sulfonic acid and o-toluene sulfonic acid.

The invention can be further understood by referring to the following examples:

Example I

A mixture of 0.1 g. of poly(9-vinylanthracene) having a molecular weight of 8,000–9,000, and 10 ml. of trifluoroacetic acid is held for two hours at about 70° C. The insoluble product is separated from excess reagent by filtration, washed with ethanol and dried. This product melts at 255–280° C., compared with 210–230° C. for the starting material. The high melting, insoluble product has molecular weight of about 8,000–9,000 and is characterized by infrared spectra as poly(9,10-dimethyleneanthracene). There is no absorption at 12.8 microns, a band which is prominent in the parent polymer and is characteristic of the exo-cyclic double bond—i.e., the vinyl group. There is a strong band at 13.2 microns, which confirms the 9,10-dialkylanthracene structure.

Example II

To a solution of 0.2 g. of poly(9-vinylanthracene) (molecular weight about 10,000) in 5 ml. of methylene chloride is added 1 ml. of trifluoroacetic acid. This solution is held at room temperature for about 18 hours, when a copious precipitate is formed. On isolation by filtration, and washing with ethanol, the product is found to melt at 290–320° C. The product is characterized by infrared spectra as poly(9,10-dimethyleneanthracene). Its molecular weight is about 10,000.

Example III

To a solution of 0.05 g. of poly(9-vinylanthracene) (molecular weight about 9,000) in 2.5 ml. of methylene chloride is added 0.05 ml. of trifluoroacetic acid. This solution is allowed to stand for 18 hours at room temperature. The rearranged polymeric product, on isolation and washing with ethanol, is found to be infusible up to at least 360° C. The product is identified by infrared spectra as poly(9,10-dimethyleneanthracene). It has a molecular weight of about 9,000.

Examples IV–IX

Example II is repeated, using a molar equivalent amount (based on trifluoroacetic acid) of each acid listed below instead of trifluoroacetic acid. The product in each case is poly(9,10-dimethyleneanthracene) having similar properties to that of the product of Example I.

IV. Trichloroacetic acid
V. o-Toluene sulfonic acid
VI. p-Toluene sulfonic acid
VII. Benzene sulfonic acid
VIII. n-Butyl sulfonic acid
IX. Iso-amyl sulfonic acid

Example X

The solution of Example III, soon after mixing, is cast onto a glass plate and allowed to stand at room temperature for 15–20 hours. A film of poly(9,10-dimethyleneanthracene) is stripped from the plate. This film absorbs gamma rays and is excited thereby, making it useful as a scintillator and radiation shield.

Example XI

A sample of poly(9-vinylanthracene) having a molecular weight of about 9,000 is cast into a thin film from a methylene chloride solution prepared as in Example III. This film is then immersed in trifluoroacetic acid at room temperature to convert it to poly(9,10-dimethyleneanthracene). The excess trifluoroacetic acid is removed by washing with water on a steam bath for about 4 hours and then dried.

What is claimed is:

1. A process for preparing poly(9,10-dimethyleneanthracene) having a molecular weight of at least about 8,000 which comprises treating a methylene chloride solution of poly(9-vinylanthracene) having a molecular weight of at least about 8,000 with an organic acid of the group consisting of halogenated carboxylic acids and organic sulfonic acids having a $K_a$ of at least $1 \times 10^{-1}$ and which is incapable of aromatic substitution.

2. The process of claim 1 wherein the halogenated carboxylic acid is trifluoroacetic acid or trichloroacetic acid.

3. The process of claim 1 wherein the organic sulfonic acid is p-toluene sulfonic acid, n-butyl sulfonic acid, iso-amyl sulfonic acid, benzene sulfonic acid or o-toluene sulfonic acid.

4. A process for preparing poly(9,10-dimethyleneanthracene) having a molecular weight of at least about 8,000 which comprises mixing poly(9-vinylanthracene) having a molecular weight of at least about 8,000 with an organic acid of the group consisting of halogenated carboxylic acids and organic sulfonic acids having a $K_a$ of at least $1 \times 10^{-1}$ and which is incapable of aromatic substitution and heating said mixture to about 70° C.

5. The process of claim 4 wherein the halogenated carboxylic acid is trifluoroacetic acid or trichloroacetic acid.

References Cited

UNITED STATES PATENTS 2,749,321   6/1956   Ham _____ 260—85.5

FOREIGN PATENTS 807,196   1/1959   Great Britain.

OTHER REFERENCES

Bergmann et al.: "Vinyl Anthrance and the Polymerization of the 9-Isomer," Chemical Society Journal–1958–PT.–3, Call No. QD1–C6.

Michel-Journal of Polymer Science Part A, vol. 2, pages 2533–2545, 1964.

JAMES A. SEIDLECK, *Primary Examiner.*